United States Patent [19]

Day et al.

[11] 4,147,004
[45] Apr. 3, 1979

[54] COMPOSITE WALL PANEL ASSEMBLY AND METHOD OF PRODUCTION

[76] Inventors: Stephen W. Day, 73 W. Alexandersville-Bellbrook Rd., Dayton, Ohio 45459; Daniel M. Hutcheson, 3855 Upper Bellbrook Rd., Bellbrook, Ohio 45305

[21] Appl. No.: 836,319

[22] Filed: Sep. 26, 1977

Related U.S. Application Data

[63] Continuation-in-part of Ser. No. 673,383, Apr. 5, 1976, Pat. No. 4,068,434.

[51] Int. Cl.² .............................................. E04C 1/00
[52] U.S. Cl. ..................................... 52/309.9; 52/404; 52/309.11; 52/741; 52/809; 52/813
[58] Field of Search .............. 52/404, 615, 620, 309.9, 52/309.11, 622, 741

[56] References Cited

U.S. PATENT DOCUMENTS

| | | | |
|---|---|---|---|
| 3,113,401 | 12/1963 | Rose | 52/615 X |
| 3,147,336 | 9/1964 | Mathews | 52/615 X |
| 3,228,158 | 1/1966 | Russell | 52/620 X |
| 3,462,897 | 8/1969 | Weinrott | 52/309.11 X |
| 3,689,681 | 9/1972 | Searer et al. | 52/220 X |
| 3,736,715 | 6/1973 | Krumwiede | 52/309.11 |
| 3,964,228 | 6/1976 | Nilsen | 52/620 |

*Primary Examiner*—Ernest R. Purser
*Assistant Examiner*—Carl D. Friedman

*Attorney, Agent, or Firm*—Jacox & Meckstroth

[57] ABSTRACT

An outer skin or facing of wood sheet material and an inner skin or facing of wood sheet material are adhesively bonded to opposite sides of a core of rigid expanded foam material to form an elongated wall unit having a horizontal length greater than its vertical height. A longitudinally extending upper portion of the wall unit incorporates adhesively bonded members which form an integral continuous beam extending horizontally from one end of the wall unit to the opposite end. The integral beam has a vertical height substantially greater than its thickness for supporting a substantial load above a door or window opening which may be subsequently formed within the wall unit at any selected location between the ends of the wall unit. A plurality of spaced wood furring strips are adhesively bonded to the inner facing of the wall unit and are provided with channels adjacent the inner facing for receiving electrical wiring. The furring strips also function to strengthen the wall unit against wind deflection and provide for an air space between the inner facing and gypsum dry wall sheeting which is subsequently attached to the furring strips. In one embodiment, the beam is formed by wood members which are vertically spaced between the facings to form a box beam. In another embodiment, thin sheets of metal are bonded by adhesive to the inner surfaces of the facings and to the foam core panels which are uniform in thickness throughout the entire wall unit.

11 Claims, 6 Drawing Figures

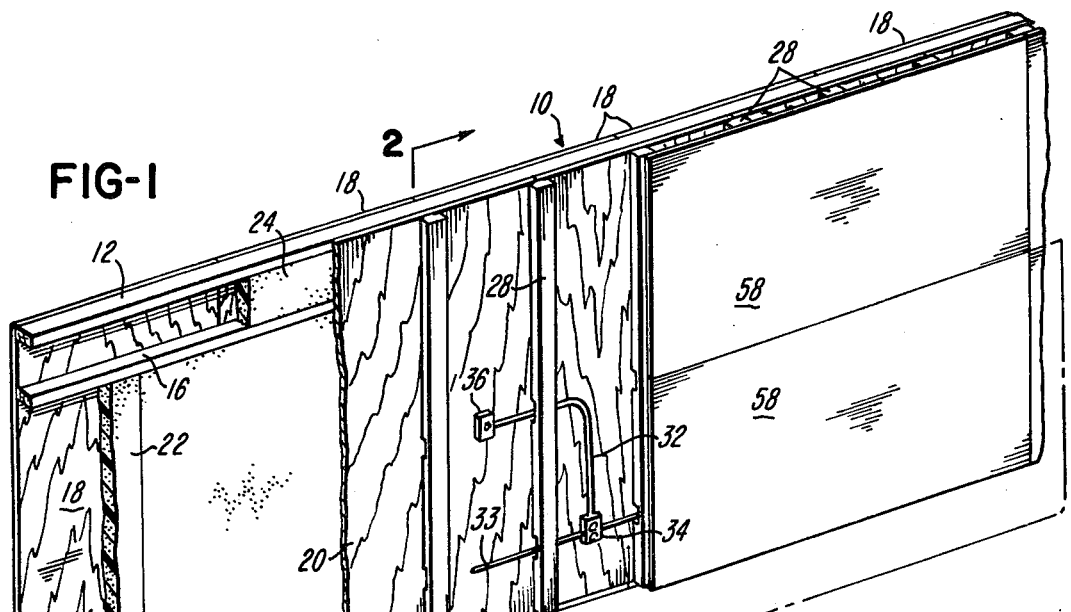
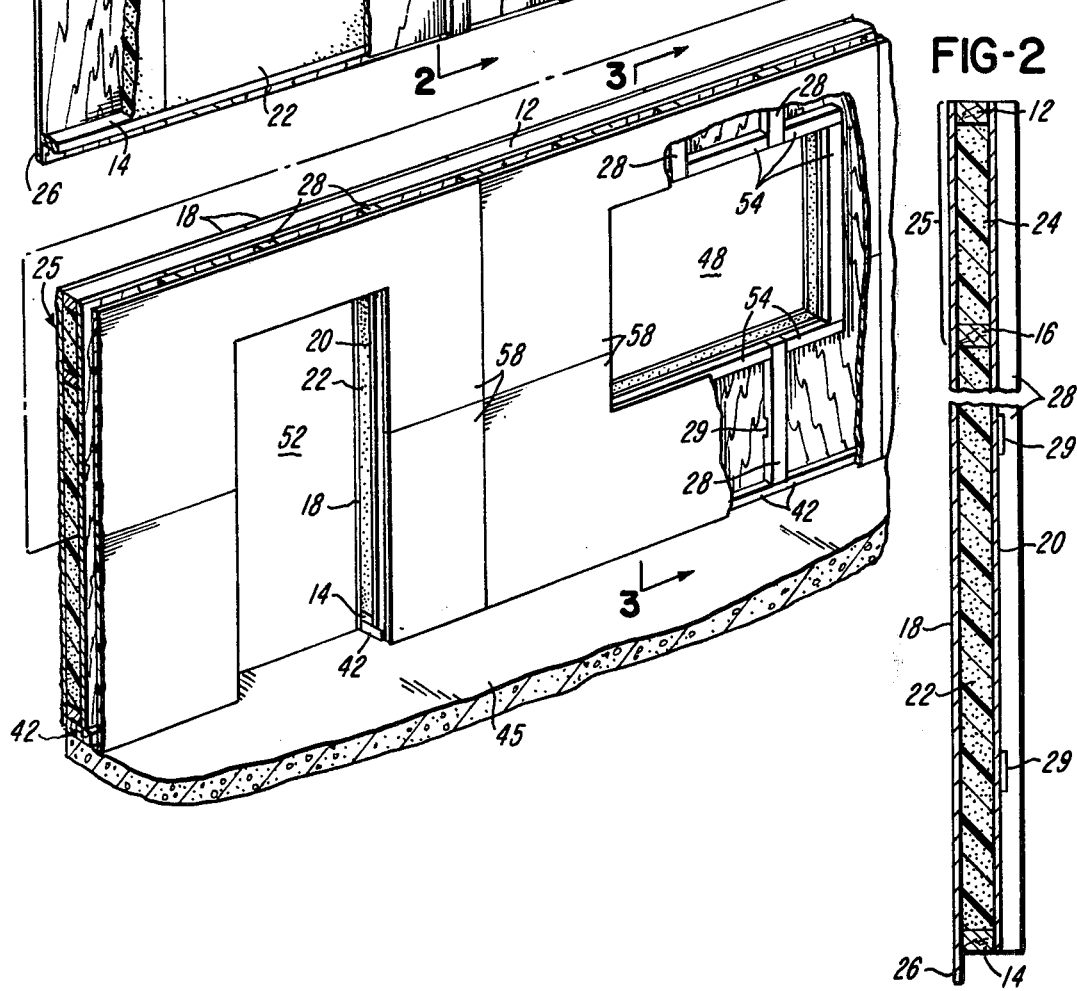

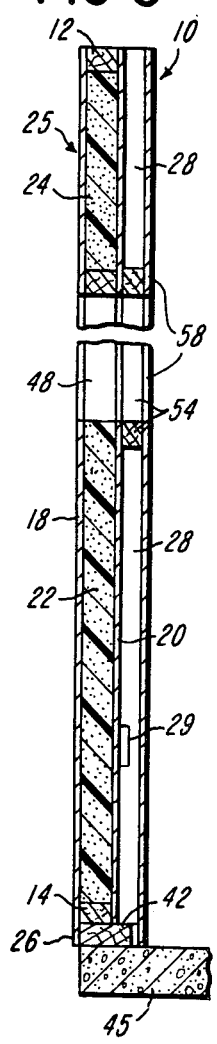
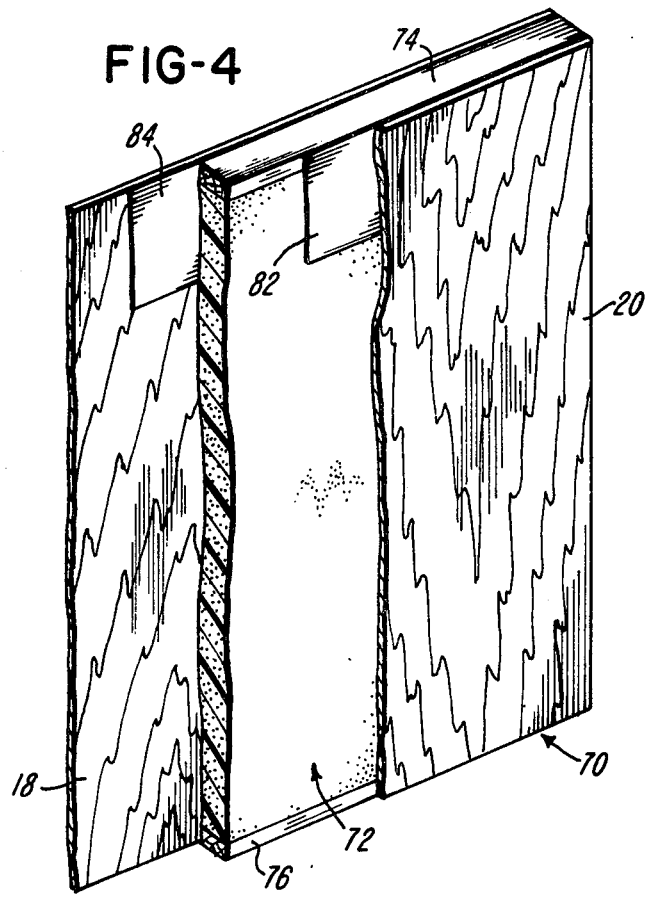
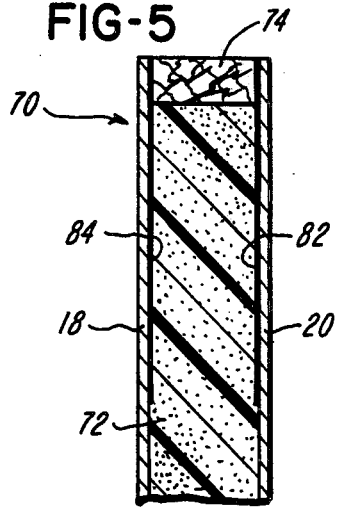
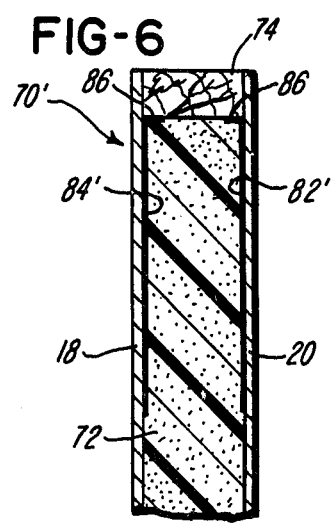

COMPOSITE WALL PANEL ASSEMBLY AND METHOD OF PRODUCTION

RELATED APPLICATION

This application is a continuation-in-part of application Ser. No. 673,383, filed Apr. 5, 1976, issued as U.S. Pat. No. 4,068,434.

BACKGROUND OF THE INVENTION

In the construction of single family and multiple family dwelling or building structures, there have been many different types of building systems either used or proposed in an attempt to provide a more efficient means of construction than the conventional on site "stick built" structure. For example, it is common to construct a structure with the use of panelized exterior walls which are prefabricated in a factory by attaching sheeting such as sheets of composite boards to parallel spaced vertical wood studs extending between a wood top plate and a wood bottom plate. The window and doorway openings are preformed within the panels by constructing a header and surrounding frame for each opening.

Such prefabricated panelized exterior walls are constructed and shipped in predetermined lengths, usually, no greater than sixteen feet and either with or without fiber glass insulation between the studs so that each wall panel may be handled and erected manually by an erection crew. Panelized wall structures have also been built with a greater length, and a crane is used at the building site to move and position each building panel which is coded for erection as a predetermined wall of a predesigned building structure. After all the exterior walls are erected and the roof system is constructed along with the framework for the interior walls, the electrical wiring is installed along with fiber glass insulation and plumbing. The inner sheeting of "dry wall" or gypsum board or paneling is then attached to the studs and joist or roof system to complete the exterior and interior walls along with the ceilings.

Building structures have also been constructed with the use of prefabricated "stressed skin" panels which may consist of plywood skins or facings bonded by adhesive to opposite sides of a wood framework including a core of vertical studs extending between top and bottom wood plates and with fiberglass or expanded foam insulation between the studs. The window and door openings are preformed within the panels by means of corresponding wood frames.

Many various types of buildings have also been either constructed or proposed for construction of foam core panels wherein rectangular panels of expanded plastics foam material, such as polystyrene or polyurethane, are sandwiched between two facings or skins of sheet material such as metal or plywood. For example, U.S. Pat. No. 3,712,004 discloses a building structure constructed of preformed panels each having an expanded plastics foam core sandwiched between two relatively thick sheets of plywood. The panels are used to construct the floor, ceiling and interior walls of the building in addition to the exterior walls. As illustrated in the patent, the abutting edges of adjacent panels are coupled together by means of a key or spline formed of wood. However, other sandwiched foam core panels with metal or plywood skins have been joined by various other forms of edge connecting means or joint systems.

In the mobile home industry, it has been determined that the floor and walls of a mobile home unit can each be constructed as a one-piece foam core panel extending the full length of the mobile home, for example, 50 to 60 feet. In the construction of such wall panels for a mobile home, the window and door openings are preframed with wood members which have the same thickness as the foam core. The foam core panels and the wood frame members are then sandwiched and pressed between an inner skin of decorative prefinished plywood or gypsum board and an outer facing or skin of exterior plywood or aluminum sheeting. The inner and outer skins are laminated to the foam core panels and the wood frame members by a suitable adhesive, and vertical grooves are formed within the foam core panels for inserting or threading the necessary electrical wiring required in the exterior walls of the mobile home.

The high insulation value of expanded plastics foam material, makes the material attractive for use in exterior walls of a dwelling or building structure, especially with the higher cost of energy for heating and air conditioning. However, the cost of prefabricating custom-made wall panels with an expanded plastics foam core sandwiched between inner and outer skins or sheeting is usually higher than conventional panelized wood stud walls. Moreover, if the foam core walls are not prewired, considerable time is required to insert electrical wiring within passages or channels formed within the foam core before the skins are attached.

It has also been found that wall panels formed with an expanded foam core laminated between rigid skins, provide somewhat of a drum effect, resulting in a higher transfer of sound through the exterior walls. In addition, it is desirable for a prefabricated foam core exterior wall panel to have a substantially standard overall wall thickness such as the 4½ inch commonly used for stud walls with dry wall sheeting or the 5⅛ inch thickness which is common for exterior stud walls with plaster interior. These standard wall thicknesses are desirable for accommodating preformed window and door jamb units.

SUMMARY OF THE INVENTION

The present invention is directed to an improved composite wall panel assembly and its method of production, and which, as one important advantage, provides for significantly reducing the cost of constructing a building structure. As another advantage, the wall assembly of the invention provides for using an expanded plastics foam material to obtain high insulation values and to minimize the use of wood members so that there is a minimum of heat transfer through the wall panel assembly. As another important feature, the wall panel assembly of the invention eliminates the need for customizing exterior wall panels by the preforming of window and doorway openings, and thereby provides for obtaining maximum efficiency in the factory production of exterior wall panel assemblies. Furthermore, in a preferred embodiment of the invention, the wall panel assembly is provided with a standard overall wall thickness for accommodating standard window frames and door jambs.

The wall panel assembly of the invention is also adapted to be constructed with a substantial horizontal length and can be conveniently handled as a result of its high strength and low weight ratio relative to conventional exterior wall panels with wood studs. The long wall panel assembly further provides the desirable feature of permitting window and doorway openings to be located at substantially any position between the ends of the wall panel, and particularly after the exterior walls of the building structure are erected, thereby providing substantial flexibility for architects, building contractors and building owners. As a result, the wall panels constructed in accordance with the present invention provide for significantly reducing the time for "closing in" or completely enclosing the exterior shell of a building structure, thereby permitting the structure to be heated as soon as possible so that electrical wiring and plumbing installations may commence without delays.

Other features and advantages of a wall panel assembly constructed in accordance with the invention will be apparent from the following description, the accompanying drawings and the appended claims.

BRIEF DESCRIPTION OF THE DRAWINGS

FIG. 1 is a fragmentary perspective view of a composite wall panel assembly constructed in accordance with the invention and with portions broken away to illustrate the internal construction of the assembly;

FIG. 2 is a vertical section of the wall panel assembly taken generally on the line 2—2 of FIG. 1;

FIG. 3 is a vertical section similar to FIG. 2 and taken generally on the line 3—3 of FIG. 1;

FIG. 4 is a fragmentary perspective view of another wall panel assembly constructed in accordance with the invention and with portions broken away;

FIG. 5 is a vertical section of the upper portion of the wall panel assembly shown in FIG. 4; and FIG. 6 is a vertical section similar to FIG. 5 and showing another modification of the wall panel assembly.

DESCRIPTION OF THE PREFERRED EMBODIMENTS

The unitized composite wall panel assembly 10 shown in FIG. 1 has a horizontal length which is substantially greater than its vertical height. For example, the assembly may have a height of approximately eight feet and a length from eight to fifty feet or more. The assembly includes a longitudinally extending horizontal top member or plate 12 and a corresponding bottom member or plate 14 which are preferably constructed of wood.

In order for the members or plates 12 and 14 to be continuous along the full length of the panel assembly 10, the adjacent ends of precut lengths of the plates are rigidly connected, for example, by finger-joints or by metal plates or by other connector means capable of transmitting tensile and compressive loads. Another continuous header member or plate 16 is also formed of wood and extends horizontally below the top plate 12 in parallel spaced relation and along the full length of the panel assembly 10. As illustrated in FIG. 1, the bottom of the header plate 16 is spaced approximately fourteen inches below the top plate 12 and approximately eighty-two inches above the bottom plate 14.

The panel assembly 10 further includes an outer skin or facing 18 and an inner skin or facing 20, and each of the facings 18 and 20 are formed by a series of 4'×8' sheets of wood material such as exterior plywood or compressed wood particle board having a thickness preferably between ¼ inch and ⅜ inch. As explained later, the outer facing 18 may have a greater thickness if it is used to provide a prefinished exterior surface. A series of panels 22 and 24 of rigid expanded polystyrene plastics foam material is spaced between the outer facing 18 and the inner facing 20, and the panels 22 and 24 cooperate with the top plate 12, the header plate 16 and the bottom plate 14 to form a core for the wall panel assembly 10. The outer skin or facing 18 and the inner skin or facing 20 are rigidly bonded to the adjacent edge surfaces of the plates 12, 14 and 16 and the outer surfaces of the foam core panels 22 and 24 by a suitable adhesive.

Referring to FIG. 2, the outer facing 18 projects below the bottom plate 14 to form a downwardly projecting continuous outer lip or flange 26. Preferably, the width of the plates 12, 14 and 16 and the thickness of the foam core panels 22 and 24 is approximately two inches. Thus when the inner and outer facings are formed by ¼ inch sheets of compressed wood particle board or plywood, the overall thickness of the laminated core and sheeting assembly is approximately two and one-half inches. As apparent in FIG. 3, the top plate 12 and the header plate 16 cooperate with the bonded inner and outer skins or sheets 18 and 20 and the foam core panel 24 to form an integral rigid box beam 25 which extends the full length of the wall panel assembly 10. As shown in FIGS. 1 and 2, the joints formed by the abutting edges of the 4'×8' sheets of the outer facing 18 are staggered or off-set with respect to the joints formed by the abutting edges of the sheets of the inner facing 20 to provide the box beam 25 and the wall panel assembly 10 with a greater strength and resistance to bending.

The wall panel assembly 10 shown in FIGS. 1 and 2, also includes a series of horizontally spaced vertical furring strips 28 which are preferably formed of wood 2"×2" having an actual width and thickness of 1.5 inch. The furring strips 28 are bonded by adhesive to the sheeting forming the inner facing 20 and are preferably spaced on uniform centers of 24 inches. Thus alternate furring strips 28 overlap the butting edges of joints of the underlying sheets forming the facing 20 and thereby form a rigid tie or splice between the adjacent sheets.

Referring to FIG. 2, each of the furring strips 28 includes a set of vertically spaced recesses or channels 29 which face the inner facing 20 and preferably have a depth of approximately 0.5 inch. As illustrated in FIG. 1, the channels 29 provide for conveniently installing electrical wiring, for example, flexible cables 32 and 33 which connect an electrical receptacle or outlet 34 and a control switch 36 to an electrical power source. It is apparent from FIG. 1 that the electrical outlets 34 and control switch 36 may be secured directly to the inner sheeting or facing 20 or to the furring strips 28.

As illustrated in FIG. 3, an exterior wall of the building structure is formed by positioning a wall panel assembly 10 on a wood sill 42 which is anchored to a top surface of a supporting foundation such as a concrete block footer or a poured concrete footer or floor 45 or a wood subfloor. Preferably, the sill 42 consists of a 2"×4" which provides for anchoring the wood bottom plate 14 by the use of nails extending though inclined predrilled holes within the bottom plate 14 and through the depending flange 26. After all of the peripherally extending panel assemblies 10 of a building structure are erected on the corresponding bottom sills 42 to form the exterior load bearing walls of the structure, a series of roof trusses (not shown) are erected in parallel spaced relation on the top plates 12 of two opposing side wall panel assemblies 10, and conventional roof sheeting is attached to the trusses. Conventional roofing materials may then be secured to the roof sheeting to form a completely enclosed dwelling or building structure.

After the exterior wall panel assemblies 10 are erected and are covered by the roof structure, the desired window openings 48 and doorway openings 52 may be cut within the wall panel assemblies 10 so that the upper edge of the openings is located at or below the continuous horizontal head or flange plate 16, as illustrated in FIG. 3. Since the box beam 25 extends continuously the full length of each exterior wall panel assembly 10, the window openings 48 and doorway openings 52 may be formed at any desired locations and may be of substantial width, for example, six to eight feet, without affecting or limiting the load bearing capacity of the wall panel assembly over the opening to carry normally imposed second floor and roof loads. For example, it has been determined that the integral box beam 25 provides the wall panel assembly 10 with a load bearing capacity of substantially greater than six hundred pounds per linear foot of top plate 12 over a window or doorway opening of approximately eight feet in width. This load bearing capacity of the wall assembly over an opening results from the fact that the integral beam 25 distributes the load supported over an opening into the adjacent wall panel portions on opposite sides of each opening. The substantial strength provided by the wall panel assembly 10 including the integral beam 25 is more than sufficient to meet performance codes for load bearing walls in single and multiple family dwelling units.

Referring again to FIG. 2, after the exterior wall panel assemblies 10 are erected and the window and doorway openings are cut, a series of wood frame members 54 are attached to the inner sheeting 20 around each of the window openings 48 and doorway openings 52 to form a spacer having a thickness equal to the thickness of the furring strips 28. Preferably, the frame members 54 are formed by sections of 2"×2" in the same manner as the furring strips 28, but frame members 54 may be attached to the inner sheeting 20 by suitable nails instead of adhesive as used to bond the furring strips 28.

After the spacing strips or frame members 54 are attached and the framework for the interior walls of the building structure is completed along with the electrical wiring and plumbing, sheets 58 of gypsum board or "dry wall" are attached to the furring strips 28 by suitable nails or screws. The sheets 58 thus cooperate with the inner sheeting or facing 20 to form a dead air space. If additional thermal insulation is desired for the exterior walls of the building structure, above and beyond the substantial insulation provided by the expanded foam plastics core 22, battens of fiber glass insulation may be installed between the furring strips 28 for filling the dead air space between the inner sheeting or facing 20 and the drywall sheeting 58, or foil-backed dry wall sheeting may be used.

Referring to FIGS. 4 and 5 which illustrates the construction of another long exterior wall panel assembly 70 constructed in accordance with the invention, panels 72 of pre-expanded polystyrene foam material are bonded by layers of adhesive to the outer wood skin or facing 18 and the inner wood skin or facing 20. In this embodiment, however, the expanded rigid foam panel 72 extends vertically from the wood top member or plate 74 to the wood bottom member or plate 76. In place of the box beam 25 described above in connection with FIGS. 1-3, the panel assembly 70 incorporates a continuous horizontal beam which includes an inner beam member 82 and an outer beam member 84 each of which is formed from a continuous strip of extremely thin sheet material such as sheet metal having a thickness less than 0.030 inch and preferably about 0.015 inch.

The thin sheet metal inner beam member 82 is bonded by adhesive to the adjacent or inner surface of the foam core panel 72 and the adjacent surface of the inner facing sheet 20, and the outer sheet metal beam member 84 is similarly bonded by adhesive to the contacting outer surface of the foam core panel 72 and the outer facing sheet 18. The sheet metal beam members 82 and 84 extend horizontally the full length of the panel assembly 70 in the same manner as the box beam 25 extends the full length of the panel assembly 10 shown in FIG. 1. The furring strips 28 may also be adhesively bonded to the inner skin of facing 20, as described above.

The adhesive lamination of the thin sheet metal beam members to opposite sides of the foam core panel 72 and the respective inner and outer facing sheets assures that the beam members remain precisely parallel and do not buckle when a substantial load is applied to the top edge of the panel assembly 70. By maintaining the flatness of each sheet metal beam member, the beam member is capable of supporting a substantial vertical load, particularly over doorway and window openings cut within the panel assembly. On the other hand, the extreme thinness of the sheet metal beam members 82 and 84 permits the preexpanded foam panels 72 to extend vertically and continuously between the top plate 74 and bottom plate 76 without requiring any cutting or notching of the foam core panels.

FIG. 6 shows a modified long wall panel assembly 70' wherein the continuous sheet metal beam members 82' and 84' each have a horizontal upper edge portion 86 which is bent inwardly to form a continuous shoulder at the top edge of the foam core panels 72 and directly under the top wood plate 74. Thus the top plate 74 rests upon the edge portions 86 to assure that the load carried by the top plate 74 is transferred to the sheet metal beam members and through the adhesive bonding to the inner and outer skins or facing sheets 18 and 20. In the wall panel assembly 70, the top plate 74 may be adhesively bonded to the upper edge portions of the sheet metal beam members 82 and 84 or a series of nails may be driven into the upper edge portions of the facing sheets and through the corresponding upper edge portions of the sheet metal beam members into the top plate 74.

As apparent from the drawings and the above description, a wall panel assembly constructed in accordance with the present invention, provides a number of desirable features and advantages. For example, each of the wall panel assemblies illustrated in the drawings is adapted to be constructed on a high volume production basis and does not require customizing with window and doorway openings at predetermined locations. As a result, the panel assemblies can be produced on a highly efficient basis thereby minimizing the cost of a panel assembly.

As another feature, each of the rectangular panel assemblies can be constructed with substantial horizontal length relative to its vertical height so that an entire wall of a building structure may be produced as a single unit, thereby minimizing the time required for erecting a building structure. The continuous integral beam 25 or beam members 82 and 84 or 82' and 84' also enable the panel assembly to be erected without forming the window and doorway openings so that the building structure may be enclosed and weathertight within a minimum time period. The internal thin sheet metal beam members 82 and 84 or 82' and 84' also significantly simplify production and lamination of the wall panel assembly 70 or 70' by permitting the use of continuous preformed foam panels 72 of uniform thickness between the top and bottom plates 74 and 76, respectively.

The continuous beam also permits the selection of locations for window and doorway openings after the exterior walls of the building structure are erected. An enclosed structure without window openings also permits immediate heating of the building structure during the framing of the interior walls and while plumbing and electrical wiring are being installed. This feature is particularly desirable when a building structure is erected prior to the arrival of the window units and also permits a contractor to store equipment and materials within the structure as soon as the structure is enclosed. It is also apparent that a wall panel assembly of the invention may be manufactured in long lengths and then subsequently cut into shorter length panels according to the exterior configuration of the building structure.

As another important feature, the high strength and insulation properties of the sandwiched foam core panels cooperate with the parallel spaced furring strips 28 to simplify the installation of electrical wiring prior to the installation of the gypsum board or drywall. The furring strips also cooperate to define a dead air space between the inner sheeting or facing 20 and the drywall sheeting 58 to minimize sound transfer through each exterior wall panel assembly in addition to providing the sandwiched foam core panel with additional strength against bowing or buckling when the panel assembly is loaded. The sandwiched foam core panel structure also cooperates with the furring strips 28 to provide the panel assembly with a standard overall thickness, for example 4½ inches including the ½ inch drywall sheeting 58, for accommodating standard window frames and door jambs. While the panel assemblies are illustrated with identical facing sheets on opposite sides of the foam core panels, it is to be understood that the outer sheeting or facing 18 may be exposed siding of plywood or other material when it is desired to eliminate the cost of an outer facing of brick, lap siding or some other modular prefinished material.

While the forms of panel assemblies and methods herein described constitute preferred embodiments of the invention, it is to be understood that the invention is not limited to these precise forms and methods, and that changes may be made therein without departing from the scope and spirit of the invention as defined in the appended claims.

The invention having thus been described, the following is claimed:

1. A composite vertical wall panel assembly adapted to simplify the construction of a building structure, comprising an inner vertical facing of rigid sheet material and an outer vertical facing of rigid sheet material disposed in parallel spaced relation, each said facing extending substantially continuously between the top and bottom of the wall panel assembly, a preformed vertical core of substantially rigid foam insulation material disposed between and contacting said inner and outer facings, a layer of adhesive bonding each said facing to the corresponding side of said core to form a laminated vertical wall unit, a horizontally extending rigid top plate member disposed between the upper edge portions of said inner and outer facings, an elongated thin flat vertical metal sheet separate from said top plate member and disposed between said core and the upper portion of one of said facings and extending horizontally along the upper portion of said wall unit, said vertical metal sheet projecting downwardly from said top plate member and having a vertical height substantially greater than the thickness of said wall unit, said foam core having a substantially uniform thickness between the top and bottom of said wall unit, and layers of adhesive bonding said metal sheet to said core and to said one facing causing said metal sheet to form a horizontally extending header beam within the upper portion of said wall unit for substantially increasing the load bearing strength of the wall unit above a doorway or window opening formed within the wall unit.

2. A wall panel assembly as defined in claim 1 wherein said metal sheet has a thickness less than 0.030 inch.

3. A wall panel assembly as defined in claim 2 and further including two separate said flat metal sheets disposed between said inner and outer facings and said core, and layers of adhesive bonding each said metal sheet to said core and to the adjacent said facing.

4. A wall panel assembly as defined in claim 1 wherein said metal sheet has a generally horizontal upper edge extending substantially flush with the upper edge of said one facing.

5. A wall panel assembly as defined in claim 1 and including a plurality of horizontally spaced vertical furring strips positioned adjacent said inner facing and projecting inwardly towards the interior of the building structure, a layer of adhesive rigidly bonding each said furring strip to said inner facing, and said furring strips being adapted to receive inner sheeting material to form an interior wall surface for the building structure.

6. A wall panel assembly as defined in claim 5 and including means defining at least one channel within each of said furring strips and extending inwardly from the surface contacting said inner facing, and said channels cooperate with said inner facing to define corresponding passages for installing electrical wiring along said inner facing.

7. A composite vertical wall panel assembly adapted to simplify the construction of a building structure, comprising an inner vertical facing of rigid sheet material and an outer vertical facing of rigid sheet material disposed in parallel spaced relation, each said facing extending substantially continuously between the top and bottom of the wall panel assembly, a preformed vertical core of substantially rigid foam insulation material disposed between and contacting said inner and outer facings, a layer of adhesive bonding each said facing to the corresponding side of said core to form a laminated vertical wall unit, a horizontally extending rigid top plate member disposed between the upper edge portions of said inner and outer facings, an elongated thin flat vertical metal sheet separate from said top plate member and disposed between said core and the upper portion of one of said facings and extending horizontally along the upper portion of said wall unit, said vertical metal sheet projecting downwardly from said top plate member and having a vertical height substantially greater than the thickness of said wall unit, said metal sheet having a generally horizontal upper edge portion projecting inwardly over the upper edge of said core and below said top plate member, said foam core having a substantially uniform thickness between the top and bottom of said wall unit, and layers of adhesive bonding said metal sheet to said core and to said one facing causing said metal sheet to form a horizontally extending header beam within the upper portion of said wall unit for substantially increasing the load bearing strength of the wall unit above a doorway or window opening formed within the wall unit.

8. A method of producing a vertical composite wall panel assembly, comprising the steps of positioning an inner facing of rigid sheet material and an outer facing of rigid sheet material adjacent opposite sides of a preformed core of substantially rigid foam insulation material, positioning a horizontally extending rigid top plate member between the upper edge portions of the inner and outer facings, forming separately from said top plate member an elongated thin flat metal sheet having a width substantially greater than the combined thicknesses of the inner and outer facings and the core, laminating the inner and outer facings to the core with corresponding layers of adhesive, and laminating the elongated metal sheet to the upper portions of the core and one of the facings with layers of adhesive and with the metal sheet projecting substantially downwardly from the top plate member to form a horizontally extending internal header beam between the upper portions of the facings for substantially increasing the load bearing strength of the wall panel assembly above a doorway or window opening formed within the panel assembly while maintaining the core with a substantially uniform thickness between the facings.

9. A method as defined in claim 8 including the step of forming the flat metal sheet with a thickness less than 0.030 inch.

10. A method as defined in claim 8 including the step of laminating another said elongated thin flat metal sheet to the core and the other facing by layers of adhesive for increasing the strength of the header beam.

11. A method as defined in claim 8 including the steps of forming a horizontally upper edge portion of the metal sheet inwardly over the upper edge of the core, and positioning the separate top plate member on the upper edge portion of the metal sheet.

* * * * *